(12) United States Patent
Go (10) Patent No.: US 7,131,668 B2
(45) Date of Patent: Nov. 7, 2006

(54) ANTI-SUBMARINING SEAT-BELT ASSEMBLY (76) Inventor: Giok Djien Go, Pfahlgrabenstr 45, D-65510 Idstein (DE) 65510

( * ) Notice: Subject to any disclaimer, the term of this patent is extended or adjusted under 35 U.S.C. 154(b) by 206 days.

(21) Appl. No.: 10/690,742

(22) Filed: Oct. 10, 2003

(65) Prior Publication Data
US 2004/0113413 A1 Jun. 17, 2004

Related U.S. Application Data (62) Division of application No. 09/554,463, filed on Apr. 19, 2000, now abandoned.

(51) Int. Cl.
*B60R 22/00* (2006.01)
(52) U.S. Cl. ............ 280/808; 280/801.2; 297/467
(58) Field of Classification Search ............ 280/801.2, 280/806, 808, 801.1; 297/464, 484, 216.1, 297/467, 483
See application file for complete search history.

(56) References Cited

U.S. PATENT DOCUMENTS

| | | | | |
|---|---|---|---|---|
| 3,977,696 A | * | 8/1976 | Igeta | 297/475 |
| 4,231,616 A | * | 11/1980 | Painter | 297/481 |
| 4,402,548 A | * | 9/1983 | Mason | 297/464 |
| 5,123,673 A | * | 6/1992 | Tame | 280/801.1 |
| 5,131,683 A | * | 7/1992 | Johnson | 280/808 |
| 5,257,854 A | * | 11/1993 | Korneliussen | 297/468 |
| 5,524,928 A | * | 6/1996 | Monagas | 280/808 |
| 5,641,200 A | * | 6/1997 | Howell | 297/256.17 |
| 6,139,111 A | * | 10/2000 | Pywell et al. | 297/484 |
| 6,179,329 B1 | * | 1/2001 | Bradley | 280/801.1 |
| 6,705,641 B1 | * | 3/2004 | Schneider et al. | 280/733 |

OTHER PUBLICATIONS

U.S. Appl. No. 09/098,294, filed Jun. 15, 1998, Tang et al.

* cited by examiner

*Primary Examiner*—David R. Dunn
(74) *Attorney, Agent, or Firm*—Giok Djien Go (57) ABSTRACT

Seat belts of a transport system are provided with anti-submarining seat-belt assemblies. A lap-belt portion of each assembly, restraining the lower part of the body of a belted passenger, is subdivided into two anti-submarining belt portions, which properly restrain the thighs when plug-in connecting at least one anti-submarining latch-plate to one of the anti-submarining buckle assemblies, all of which, equipped with energy absorbers, are arranged in a seat cushion. As a result, the energy-absorbing, anti-submarining seat-belt assembly substantially lowers great belt force in an accident, reduces the elongation of the seat belt and prevents submarining.

A separately operated release button, when depressed, frees the passenger from the anti-submarining protection.

Ease of use is ensured by one-click operation of a master release-button, which, when depressed, releases all latch-plates.

Detachable anti-submarining latch plates, when not in use, are stored in a storage box. When needed they are attached to the lap-belt portion.

19 Claims, 6 Drawing Sheets

ANTI-SUBMARINING SEAT-BELT
ASSEMBLY

CROSS REFERENCE TO RELATED
APPLICATIONS

This is a divisional application of the U.S. Ser. No. 09/554,463 filed on Apr. 19, 2000 now abandoned, related to an international application number PCT/DE98/03270 (WO 99/24294, European Patent EP 1 037 773 B1, German Patent DE 197 49 780 C2) filed Nov. 10, 1998.

BACKGROUND OF THE INVENTION

1. Field of the Invention

It is an object of the present invention to prevent a restrained passenger of a transport system (motor vehicle, ship, train or aeroplane) from submarining in the event of any accident (front-, side-, rear-end collision and/or rollover or pile up/mass collision) or during in-flight turbulence.

2. Discussion of the Prior Art

It is known in the prior art to provide for a passenger of a transport system an anti-submarining device in order to prevent severe/fatal injury in an accident.

In order to formulate in single terminology a generalized definition is presented for the proper term:

| Definition: | Proper Term: |
|---|---|
| "Stiff first transport-system member" | Floor 6 of the transport system adjacent to a first seat-side SR (FIG. 1) or seat-cushion frame at the first seat-side or mid-tunnel (not drawn) of the motor vehicle adjacent to the first seat-side. |
| "Stiff second transport-system member" | Floor 6 of the transport system adjacent to a second seat-side SL or seat-cushion frame at the second seat-side or post section (not drawn) of the motor vehicle adjacent to the second seat-side or side rail of the motor vehicle adjacent to the second seat-side |
| "Seat frame" | Seat-cushion frame or seat-backrest frame |

In order to prevent whiplash front seats of SAAB 9-5 cars are equipped with active head restraints (rests) that, activated by the mass inertia forces of the upper body-parts (torsos) in rear-end collisions, move up and closer to heads of front-seated occupants. See shortcomings, undermentioned.

In collaboration with Autoliv Corp., the biggest car-supplier in the world, Volvo Corp. has developed WHIPS (Whiplash Injury Prevention System), installed in the front seats of Volvo S80s. Under load of mass inertia forces of a passenger's torso in a rear-end collision the hinge of the seat backrest yields and partially rotates backwards and downwards to facilitate the head rest to intercept the head and the seat backrest, filled with pads, to absorb forces. When a car crashes into the rear section of a S80 and both catch fire, the front-seated passengers and their seat backrests, rotated backwards and downwards, impede the evacuation of the back-seated passengers, who may be severely injured. The front-seated passengers must sit up in order to take further action. Taken as given, the rotated seat backrests cannot be returned to the home position precious time elapses to step out of the car. This raises the question of how the unscathed passengers and/or unscathed back-seated children, exposed to explosion, burn and/or toxic smoke, can evacuate themselves out of the car and/or how rescue workers can evacuate all the severely injured back-seated passengers.

Due to lack of space, in which the SAAB and Volvo protective devices should be installed, heads of rear-seated passengers are unprotected, hence, subjected to whiplash and severe/fatal injury resulting from submarining. For sure, both protective devices remain ineffective in a multi-crash when the front-seated passengers, being submarining underneath their respective lap belt portions, is crushed into death by the airbags, deployed in the front-end crash or falsely deployed in the rear-end crash.

Exemplified in DE 43 36 351 A1 (U.S. Ser. No. 979,938), a pan, moveable along a pair of rails beneath the seat cushion, is activated in a rear-end collision and moved out therefrom to intercept a submarining passenger when falling down therefrom. Ref. to EP 0 403 072 A2 (U.S. Ser. No. 364,765) a pair of U-shaped ramps is built in a rear seat. Each ramp comprises two longitudinal members, both fastened to the vehicle floor, and a lateral member, which, arranged along the front portion of the rear seat, intercepts a submarining passenger in a rear-end collision.

Both anti-submarining devices can never prevent severe/fatal injuries linked to great belt force, deployed or falsely deployed airbags, different weights and/or different body proportions.

Figure 4:
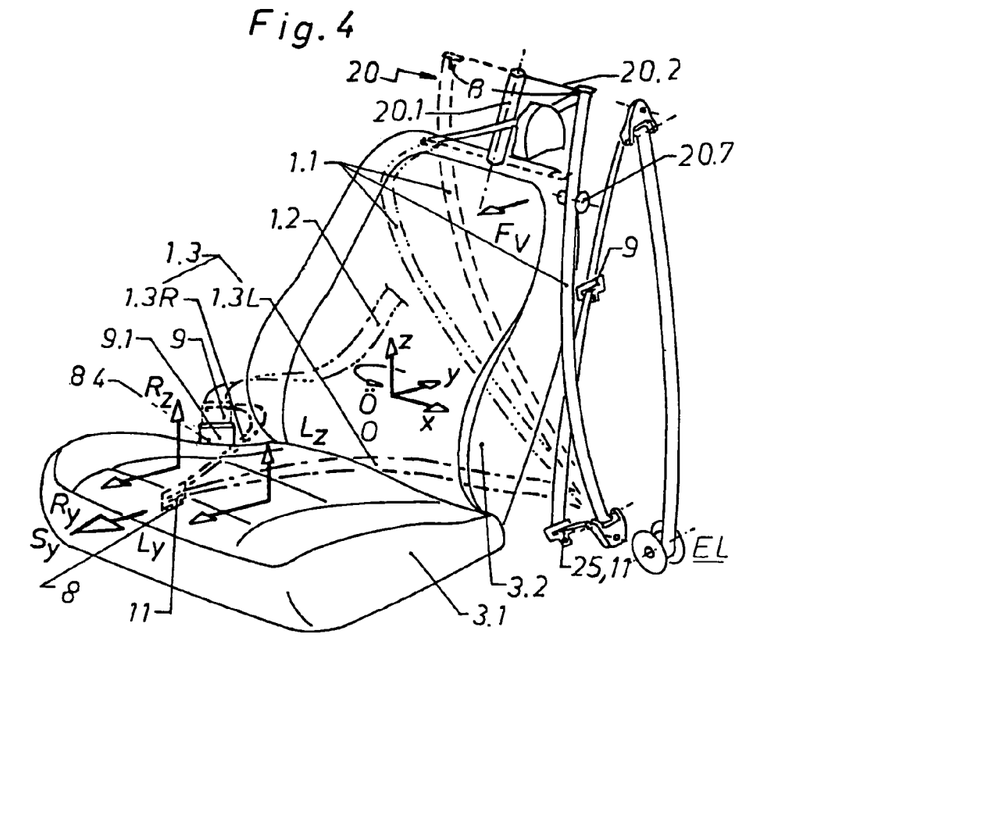
FIG. 4 is a perspective view of a anti-submarining latch plate 11 of a lap belt portion 1.3 in plug-in connection with the anti-submarining buckle assembly 8.

When a Ford Mondeo, swerving on a road outside the city Idstein, crashes twice into a barrier and finally into a bus, the face of an obese female driver, submarining, is fractured and crushed by the airbag into her skull. In a real-world accident at far higher speed and strong yaw-acceleration great rotatory- and longitudinal-acceleration dependant forces (FIGS. 4, 5) enormously elongate the lap belt portion underneath which the belted passenger submarines in the direction "$Z_E$" due to the limitation of the belt pretensioner which can only retract the seat belt up to 30 cm. This accident report is incorporated herein.

Any belted passenger, lying in a sleeping position ref. to DE 37 41 831 C2 (FIG. 7), submarines when being loaded by great mass inertia force "$S_y$" in the direction "$Z_E$" in the event of accident.

In view of foregoing shortcomings and deficiencies, there is a need to ensure the restraint of any passenger as well as the operation of the anti-submarining devices in any accident.

SUMMARY OF THE INVENTION

Accordingly, the principle object of the present invention is to provide for passengers of a transport system anti-submarining seat-belt assemblies which resolve the above-mentioned shortcomings and deficiencies, prevent submarining, absorb impact energy and are suited for two-, three- and multi-point seat belts.

A second object of the present invention resides in one-click operation by means of a master release button, when depressed, to release the main and anti-submarining latch plates from the respective buckle assemblies. In emergency cases paramedics and fire-fighters can easily rescue the injured passengers.

Figure 1:
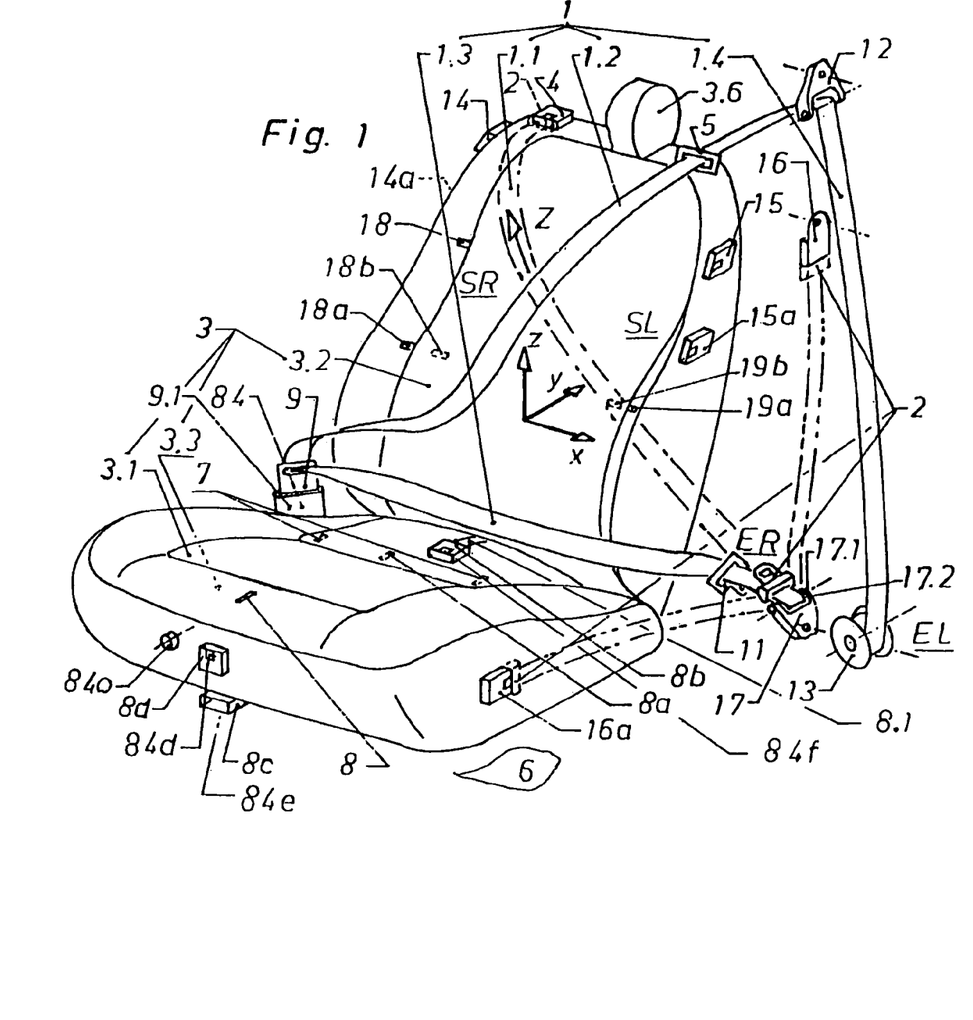
FIG. 1 is a perspective view of a seat with upper buckle assemblies and anti-submarining buckle assemblies 7, 8, 8a to 8d, attached to the seat backrest and seat cushion, as well as of a restraint system consisting of a multi-point seat belt 1, latch plate 11 along the lap belt, shoulder latch plate 2 of belt end, in the direction of arrow "Z" in plug-in connection with an upper buckle assembly 4, and a seat belt in X-shape, formed by crossing both shoulder belt portions 1.1, 1.2.
Figure 5:
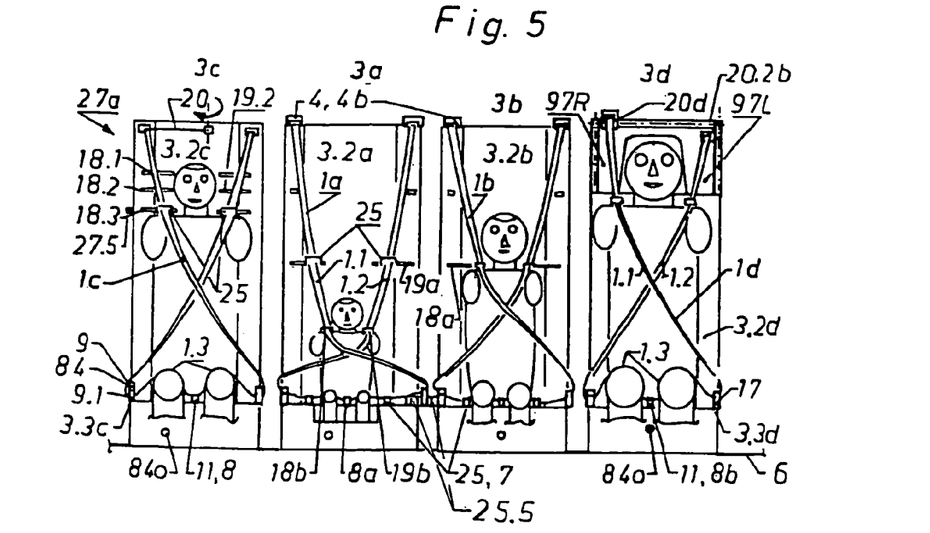
FIG. 5 is a front view of the seat 3a to 3d, in which the restraint systems 1a to 1d, anti-submarining seat-belt assemblies and storage boxes 25.5 are integrated, for passengers of different weights, different circumference of thighs and different body proportions (sizes), where anti-submarining buckle assemblies are in plug-in connection with the anti-submarining latch plates 11, 25.

A third object of the present invention resides in a cost-, space-saving integration of a multi-point seat belt, equipped with energy absorbers, the anti-submarining seat-belt assembly and the seat into a safety seat, which can be converted into a baby-cot, child-seat or adult seat and vice-versa, illustrated in FIGS. 1, 5.

INDUSTRIAL APPLICABILITY

Figure 3A:
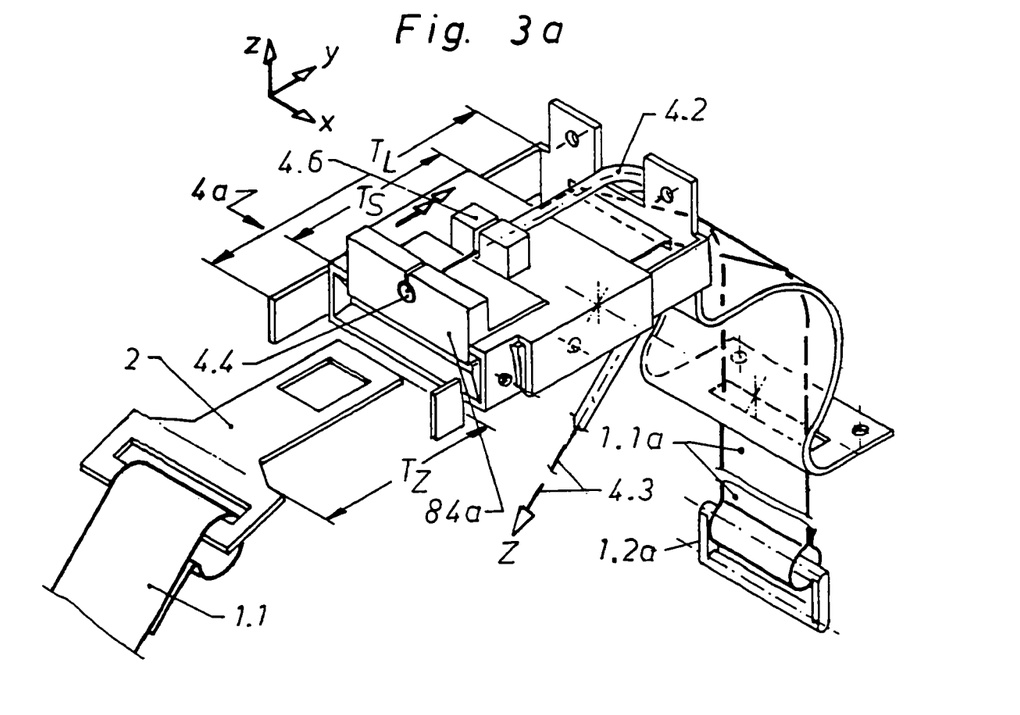
FIG. 3a is a schematic, perspective view of a $1^{st}$ embodiment of a buckle assembly 4a, equipped with a release cable 4.2.
Figure 3B:
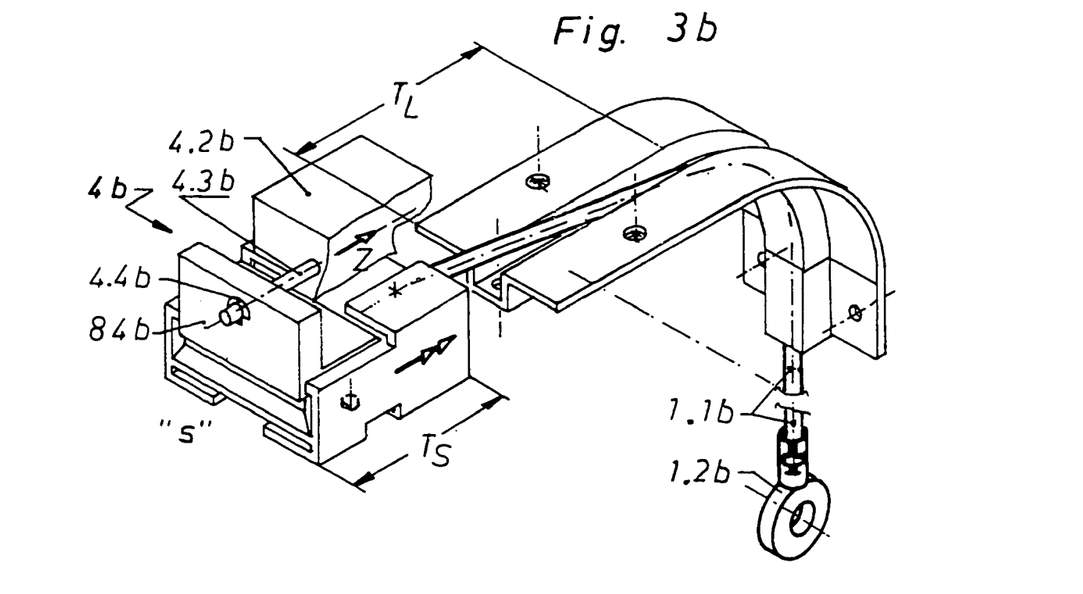
FIG. 3b is a schematic, perspective view of a $2^{nd}$ embodiment of a buckle assembly 4b, equipped with an electrical release-motor 4.2b.
Figure 3C:
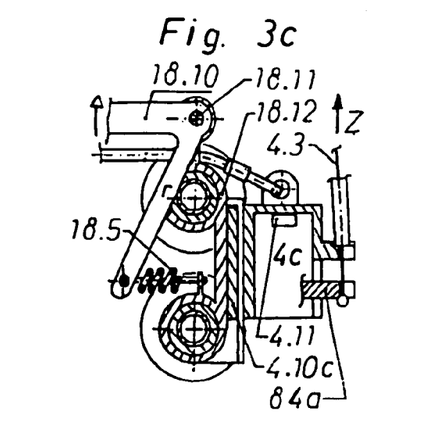
FIG. 3c is a schematic, perspective view of a $3^{rd}$ embodiment of a buckle assembly 4c, equipped with a release cable 4.3.
Figure 7:
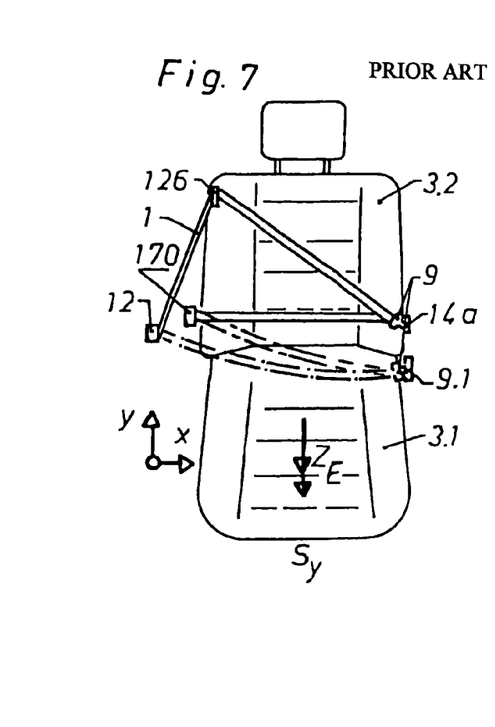
FIG. 7 is a top view of a ∠-shaped seat belt ref. to DE 37 41 831 A1, where a belted passenger, in sleeping position, under load of great mass inertia force "$S_y$" in the direction "$Z_E$" submarines.
Figure 8:
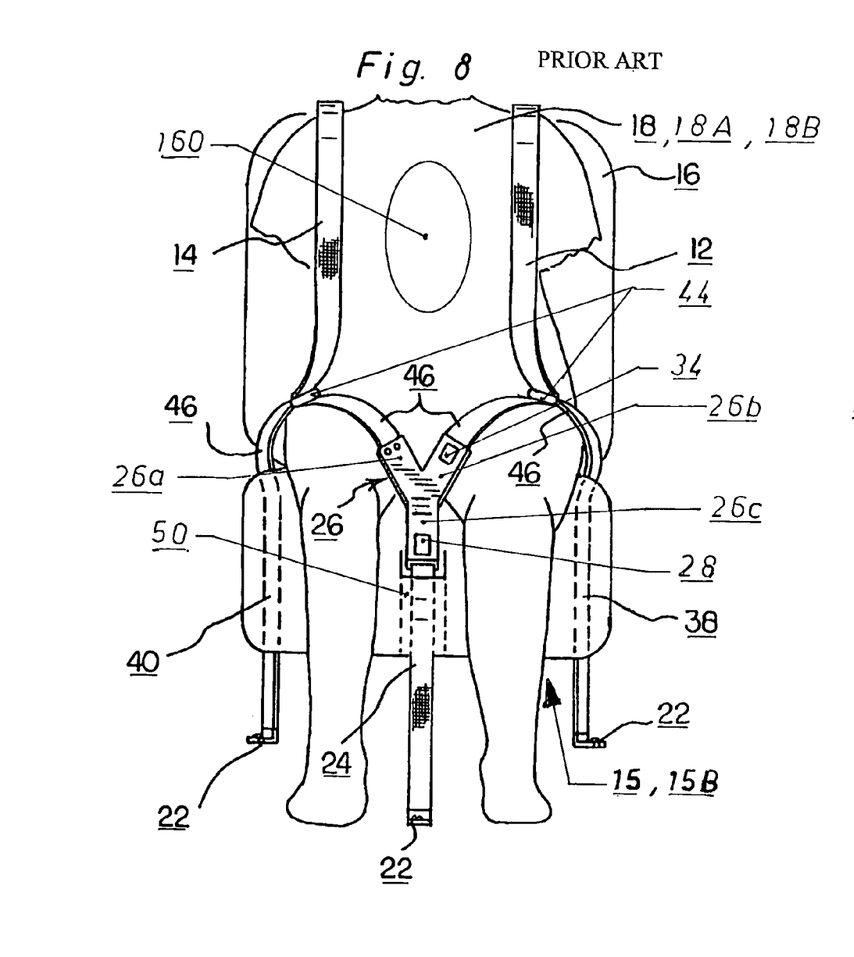
FIG. 8 is a front view of a fixed seat equipped with a harness restraint system ref. to U.S. Pat. No. 5,524,928.
Figure 9:
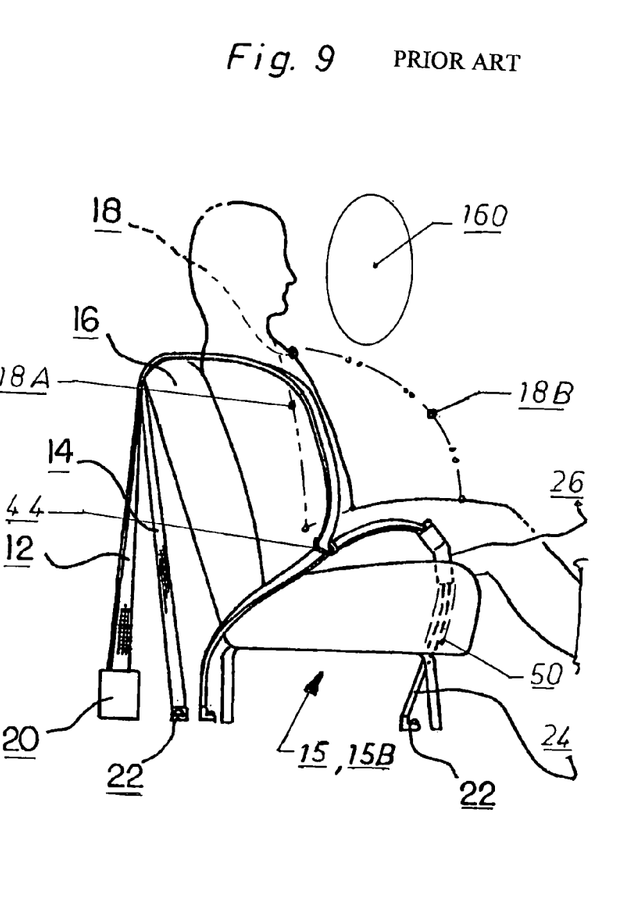
FIG. 9 is a side view of the fixed seat equipped with the harness restraint system ref. to U.S. Pat. No. 5,524,928.
Figure 10:
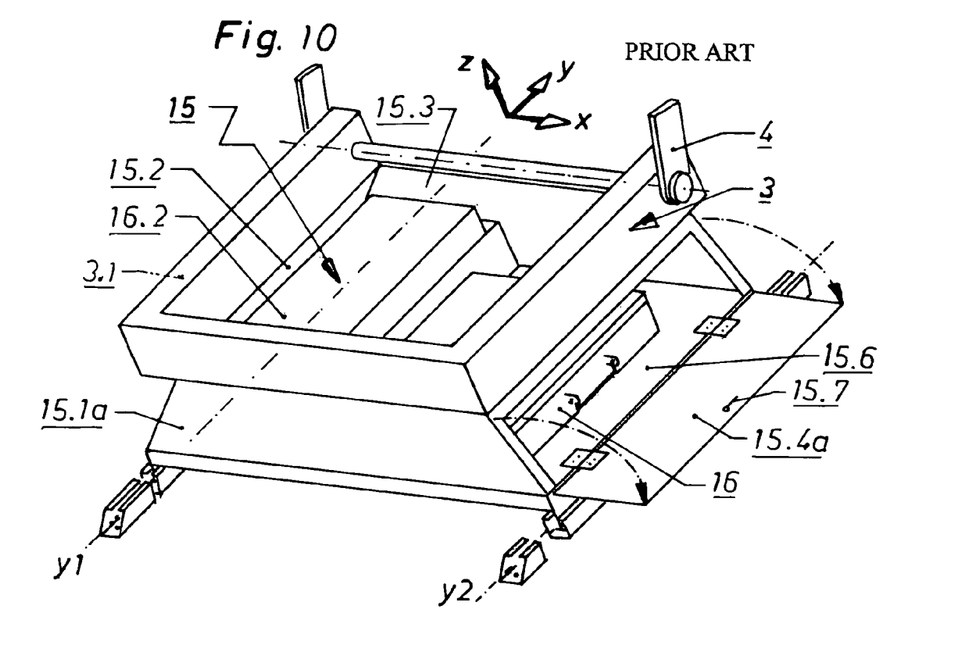
FIG. 10 is a perspective view of a seat, moveable along a pair of floor rail assemblies equipped with a storage bin 15 ref. to DE 196 55 051 C2.
Figure 11:
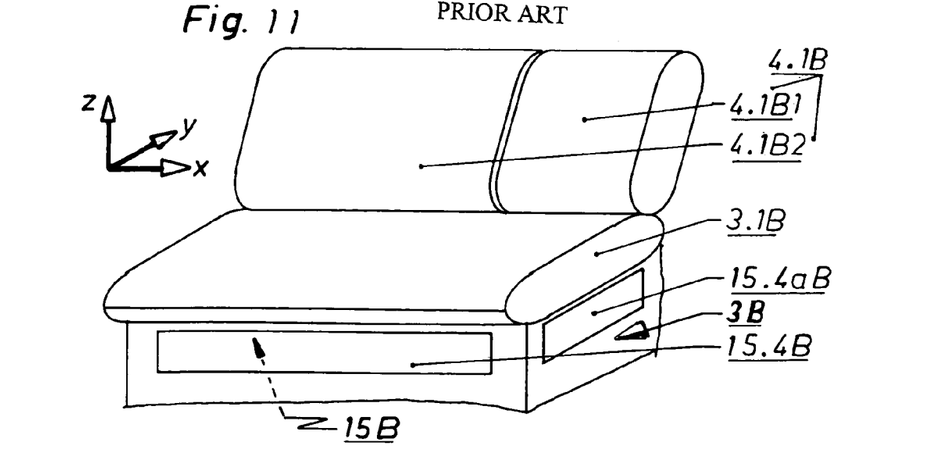
FIG. 11 is a perspective view of a fixed seat equipped with another storage bin 15B ref. to DE 196 55 051 C2.

It should be apparent that the invention provides substantially improved restraint including the following features:

a) The survival chance is enhanced by the restraint of
   both shoulders and the torso, when the passenger is thrown forward (Table 3) and/or subjected to the yaw Ö-acceleration-dependent torque $T_\delta$, and
   both thighs and the lower body-part of the body, when the passenger submarines.

b) A number of sets of energy absorbers ref. to U.S. Ser. No. 09/554,464 (WO 99/24292, PCT/DE98/03271, European Patent EP 1 037 771 B1, German Patent DE 197 58 498 C2, and CA pending patent 2,314,345) or German Patent DE 197 58 497 C2 can be attached to coupling fittings of anti-submarining seat belt assemblies (FIGS. 3a, 3b, 3c). Hence, large impact energy can be gradually absorbed below the respective injury-related values. Several sets of energy absorbers can be attached to a length-adjustable belt of the anti-submarining seat belt assembly 8b, 8c (FIG. 1). The inventor of the present application has submitted those patent documents and applications to CIPO as well as USPTO. The energy absorber consists of a number of clamping elements, having sites of predetermined fracture, and a retaining element, which, fastened to the seat backrest frame and/or seat frame, can serve as an integral part thereof.

c) Owing to the different positions of anti-submarining buckle assemblies, in plug-in connection with the respective anti-submarining latch plates, passengers of different body proportions, thighs and weight can adjust the length of the anti-submarining belt portions 1.3R, 1.3L by themselves. Moreover, the adult seats, equipped therewith, can be modified for children and vice versa, thus increasing the rate of seat occupancy in a bus, train or an aeroplane, exemplified in FIG. 5. In another embodiment the length-adjustable belt of the anti-submarining seat belt assembly 8b, 8c facilitates, for example, a female passenger to adapt the belt length to her long gown or to herself, when lying in sleeping position (FIGS. 1, 7).

Figure 2:
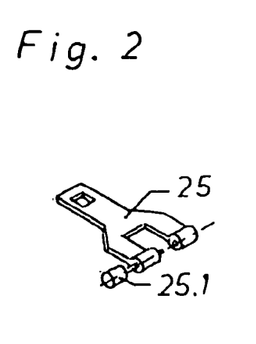
FIG. 2 is a schematic view of a detachable anti-submarining latch plate 25.

For safety reasons and easy access the anti-submarining latch plates 11, 25, when not being used, are stored in a storage box 25.5 (FIG. 5). The belt-detachable anti-submarining latch plates 25 (FIG. 2) are detached to the lap belt portion when needed.

For the convenience of the passenger, when stepping out, or for a fast rescue of the passenger injured in an accident, the master release button 84 of the buckle assembly 9.1 is depressed to release all latch plates from the buckle assemblies.

BRIEF DESCRIPTION OF THE DRAWINGS

A number of embodiments, other advantages and features of the present invention will be described in the accompanying tables and drawings with reference to the xyz global coordinate system.

Table 1 shows test data such as left/right thigh-force, belt force and pitch-angle of driver and co-driver in 50% offset crash test of several European vehicles at crash speed of 55 km/h.

Table 2 shows yaw angle O of driver/co-driver in a 50% offset crash tests.

Table 3 shows test data of the safest child-restraint system Chico Shuttle® at the converted velocity of 55 km/h in comparison with the safest vehicle among them listed in Table 1.

DESCRIPTION OF THE PREFERRED EMBODIMENTS OF THE INVENTION

The advantages of the preferred embodiments in the Chap. "INDUSTRIAL APPLICABILITY" are outlined hereinafter with regard to the functions and features thereof.

Figure 6:
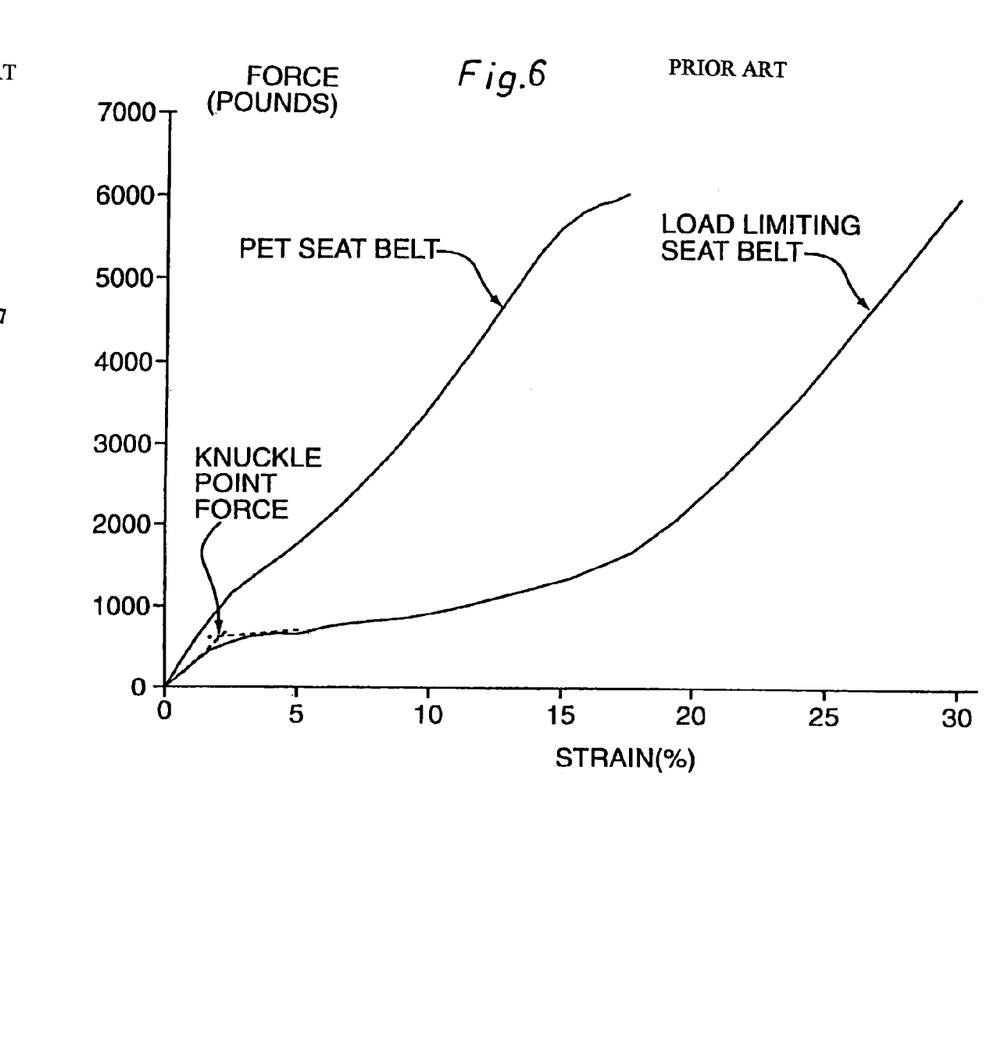
FIG. 6 illustrates two curves of strain/elongation rate dependent from force ref. to PCT/US99/13362.

Just at a crash speed of 55 km/h the belt force of a driver of the premium car AUDI A8 is measured 9,130 N (Table 1) equivalent to 2,015 Pound by which the seat belt is elongated (strained) about 19% (FIG. 6). The elongation ranges from 47.5 to 57 cm when the seat belt is 2.5 to 3 m long. In case the belt pretensioner remains inoperative and, in particular, the total mass inertia force "$S_y$" of the lower body-part is far larger than that of the upper body-part the passenger slips (submarines) underneath the lap belt portion in a real-world accident. The method of the present invention capitalizes on the premise that a lap belt portion, restraining a lower body-part of the belted passenger, is subdivided into two anti-submarining belt portions 1.3R, 1.3L which properly restrain as well as hold his thighs when plug-in connecting at least one anti-submarining latch plate 11, 25 to the respective one of anti-submarining buckle assemblies 7, 8, 8a to 8d, all of which are equipped with energy absorbers, shown in FIGS. 1, 4 and 5. As a result, the anti-submarining seat-belt assembly in association with energy absorbers
- substantially lowers large belt force, for example, of 15,190 N at only 55 km/h (Table 1), in a real-world accident or during in-flight turbulence,
- prevents large elongation of the seat belt webbing, severe/fatal injury and the passenger of a Mercedes Car, lying in the sleeping position (FIG. 7), from submarining and
- ensures the operation of the active head restraint of SAAB 9-5 and Volvo's WHIPS.

In an embodiment the release button 84f, 84e of free-moving anti-submarining buckle assembly 8b, 8c (FIG. 1), whose housing is free-moving on the seat cushion and whose length-adjustable belt is fastened to the seat frame, can be controlled neither by a release cable 4.2 nor by an electrical release-motor 4.2b. Hence, the release button 84e, 84f can only be activated by an electrical signal emitted from the master release button 84, when depressed, to remove the protection from submarining.

Because the reel (spool) of the conventional belt retractor can accommodate only a limited length of belt, it is possible that the length of the seat belt for the sleeping position is insufficient. The length-adjustable belt compensates for the length of seat belt 1 and accommodates the passenger, particularly when being obese, in all positions between the sleeping and normal position. An anti-submarining buckle assembly 8d, provided with a release button 84d, is attached to the front portion of the seat cushion. This feature facilitates the obese passenger or a lady in a gown to restrain the thighs by plug-in connecting the anti-submarining latch plate 11 thereto.

Due to the plug-in connection of the anti-submarining latch plates 11, 25 with the anti-submarining buckle assemblies a lady in a long gown as well as a child are well protected from submarining. The anti-submarining belt portions, restraining a child's or baby's thighs with small circumference, are secured to the seat cushion by the latch plate 11, plug-in connected to one of the anti-submarining buckle assemblies 8, 8a to 8d, and the detachable anti-submarining latch plates 25, plug-in connected to at least one pair of anti-submarining buckle assemblies 7 (FIGS. 1, 5). For safety reasons and easy access the anti-submarining latch plates, when not being used, are stored and secured in a storage box 25.5 of the seat (FIG. 5).

In the $1^{st}$, $2^{nd}$ and $3^{rd}$ embodiment (FIGS. 3a to 3c) the buckle assembly 4a, 4b, 4c is form- and/or force-locking connected to the seat-backrest frame. For the convenience of the passenger when egressing from the vehicle and in cases of emergency the following embodiments of detachment are proposed:

To disconnect the latch plates 2, 11 and/or 25 from the upper buckle assemblies 4, 18, 18a, 18b, 18.1 to 18.3, 19, 19a, 19b, 19.1 to 19.3 (FIGS. 1 and 5) of the seat arrangement, particularly in the case of children, as well as from the anti-submarining buckle assemblies 7, 8, 8a to 8d (FIGS. 1, 4), the master release button 84, when depressed, activates the release cables 4.2 and/or electrical release-motors 4.2b, which pull the release button 84a and/or 84b of all the buckle assemblies (FIGS. 3a, 3b, 3c).

By law passengers travelling in a motor vehicle or experiencing flight-turbulence must remain belted. The need for a belted mother to turn around becomes apparent, when she must attend to her children sitting on the rear seat. The separately operated release buttons 84o, 84d, 84e, 84f, when depressed, detach only the anti-submarining latch plates 11, 25 of the lap belt portions from the assemblies 7, 8, 8a to 8d (FIGS. 1, 4 and 5) to free the mother and/or children from the anti-submarining protection while the mother and/or children remain belted. The anti-submarining buckle assemblies 7, 8, 8a, whose housings are located in the seat cushion 3.1, 3.1a to 3.1d, have the common release button 84o on the seat.

Although the present invention has been described and illustrated in detail, it is clearly understood that the terminology used is intended to describe rather than limit. Many more objects, embodiments, features and variations of the present invention are possible in light of the above-mentioned teachings. Therefore, within the spirit and scope of the appended claims, the present invention may be practiced otherwise than as specifically described and illustrated.

TABLE 1

|  | left/right femur-force of driver | left/right femur-force of co-driver | belt-force of driver/co-driver | $U_H$ |
|---|---|---|---|---|
| Fiat Tipo ® | 15190 N | nR N | 5620/6100 N | 20/80° |
| Opel Corsa ® | 2258/2700 | 1381/2315 | 7030/7310 | 25/90 |
| VW Polo ® | 2785 | 1587 | 5142/5655 | 45/70 |
| Fiat Bravo ® | 3700 | 2300 | nR/6800 | 10/45 |
| VW Golf ® | 2340 | 1630 | 6040/7050 | 50/50 |
| MB C ® | 6858 | 2362 | 6015/6685 | 20/30 |
| MB E200 ® ohne Airbag | 1480 | 2140 | 8220/8380 | / |
| VW Passat ® | 1600 | 2100 | 3400/4700 | 20/40 |
| AUDI A6 ® | 700/1200 | 1500/1100 | 6900/8400 | 25/50 |
| Opel Omega ® | 2750 | 2180 | 6580/6160 | nR/40 |
| BMW 528i ® | 1400/1200 | 900/1300 | 3600/3400 | 10/30 |
| MB E320 ® | 2200/1700 | 1200/900 | 3000/3800 | 5/30 |
| AUDI A8 ® | 2360 | 2610 | 9130/8510 | 40/50 |
| BMW Z3 ® | 1300/1400 | 1300/900 | 8300/4400 | 0/10 |
| MB SLK ® | 5100/1700 | 800/4400 | 3300/3700 | 0/40 |
| FB | nR/8300 | 2733/3980 | 6144/5415 | 5/85 |
| Renault Espace ® | 2037/11206 | 1323/1418 | 6829/7885 | 5/90 |
| Opel Sintra ® | 4100 | 4700 | 5300/6400 | 60/30 |
| VW Sharan ® | 2300 | 2600 | 6500/5700 | 35/70 |

FB = Peugeot 806 ®, Citroen Evasion ®, Fiat Ulysse ®, Lancia Zeta ®
nR = no result

TABLE 2

|  | yaw O of driver/co-driver |
|---|---|
| BMW Z3 ® | 85/90° |
| MB SLK ® | 100/nR |

TABLE 3

|  | force of head | acceleration of head | acceleration of chest | force of neck | forward motion |
|---|---|---|---|---|---|
| child-seat | 696 HIC | 65 g | 59 g | 1516 N | 552 mm |
| AUDI A4 ® | 392 | 49 | 45 | | |
| MB E320 ® | 229 | 38 | 40 | | |
| child-seat to MB E320 ® | 304% | 171% | 148% | | |

What is claimed:

1. An anti-submarining seat-belt assembly for a seat having a seat cushion, comprising
    a seat belt, comprising a shoulder belt portion (1.2), a lap belt portion (1.3) and an extending belt portion (1.4);
    a main buckle assembly (9.1), having a master release button (84) and attached to a stiff first transport-system member, which is a floor of the transport system adjacent to a first seat-side or a seat-cushion frame at the first seat-side or a mid-tunnel of a motor vehicle adjacent to the first seat-side;
    a lower belt deflector (17), which, thereto a belt end of the lap belt portion (1.3) is connected, is attached to a stiff second transport-system member, which is the floor of the transport system adjacent to a second seat-side or the seat-cushion frame at the second seat-side or a post section of the motor vehicle adjacent to the second seat-side or a side rail of the motor vehicle adjacent to the second seat-side;
    at least two latch plates (9, 11, 25), the first of which is a main latch plate (9), moveable along the lap- or shoulder belt portion, and the second of which is an anti-submarining latch plate (11, 25), moveable along the lap belt portion; and
    anti-submarining buckle assemblies, attached to a seat frame of the seat, which is the seat-cushion frame or a seat-backrest frame;
    whereby
    a lower part of the body (96) of the passenger and an upper part of the body (95) are restrained by the lap- and shoulder belt portions (1.2, 1.3) when the main latch plate (9) is plug-in connected to the main buckle assembly (9.1); and
    the lap belt portion (1.3) is subdivided into two anti-submarining belt portions (1.3R, 1.3L) to restrain thighs of the passenger when the anti-submarining latch plate is plug-in connected to one of the anti-submarining buckle assemblies.

2. The anti-submarining seat-belt assembly according to claim 1, wherein the anti-submarining buckle assemblies (7, 8, 8a) have housings, located in the seat cushion (3.1, 3.1a to 3.1d), and a common release button (84o), located on the seat, where the common release button, when depressed, releases the anti-submarining latch plate.

3. The anti-submarining seat-belt assembly according to claim 1, wherein the anti-submarining buckle assemblies (8d) have housings, located on the seat cushion (3.1, 3.1a to 3.1d) and provided with a release button (84d), which, when depressed, releases the anti-submarining latch plate.

4. The anti-submarining seat-belt assembly according to claim 2, wherein the master release button (84) is provided with release cables (4.2) connecting to release buttons of the anti-submarining buckle assemblies where the master release button, when depressed, releases the main latch plate and the anti-submarining latch plate from the respective buckle assemblies.

5. The anti-submarining seat-belt assembly according to claim 3, wherein the master release button (84) is provided with release cables (4.2) connecting to release buttons of the anti-submarining buckle assemblies where the master release button, when depressed, releases the main latch plate and the anti-submarining latch plate from the respective buckle assemblies.

6. The anti-submarining seat-belt assembly according to claim 2, wherein the master release button (84) is provided with release wires connecting to electrical release-motors (4.2b) of release buttons of the anti-submarining buckle assemblies where the master release button, when depressed, releases the main latch plate and the anti-submarining latch plate from the respective buckle assemblies.

7. The anti-submarining seat-belt assembly according to claim 3, wherein the master release button (84) is provided with release wires connecting to electrical release-motors (4.2b) of release buttons of the anti-submarining buckle assemblies where the master release button, when depressed, releases the main latch plate and the anti-submarining latch plate from the respective buckle assemblies.

8. The anti-submarining seat-belt assembly according to claim 1, wherein the anti-submarining latch plate is a belt-detachable latch plate (25), having a quick-release pin (25.1) and a U-shaped portion to house the lap belt portion which is secured therein by the quick-release pin and detached therefrom by pulling it.

9. The anti-submarining seat-belt assembly according to claim 8, wherein the anti-submarining belt portions are provided with at least one pair of belt-detachable latch plates (25), which are plug-in connected to the anti-submarining buckle assemblies in the seat cushion at the first and second seat-side to properly restrain the thighs with small circumference.

10. The anti-submarining seat-belt assembly according to claim 9, wherein the anti-submarining buckle assemblies (7, 8, 8a) have housings, located in the seat cushion (3.1, 3.1a to 3.1d), and a common release button (84o), located on the seat, where the common release button, when depressed, releases all the anti-submarining latch plates.

11. The anti-submarining seat-belt assembly according to claim 9, wherein the master release button (84) is provided with release cables (4.2) connecting to release buttons of the anti-submarining buckle assemblies where the master release button, when depressed, releases the main latch plate and the anti-submarining latch plates from the respective buckle assemblies.

12. The anti-submarining seat-belt assembly according to claim 10, wherein the belt-detachable anti-submarining latch plates (25), when not being used, are stored and secured in a storage box (25.5) of the seat.

13. The anti-submarining seat-belt assembly according to claim 11, wherein the belt-detachable anti-submarining latch plates (25), when not being used, are stored and secured in a storage box (25.5) of the seat.

14. The anti-submarining seat-belt assembly according to claim 1, wherein a free-moving anti-submarining buckle assembly (8b, 8c) has a housing, free-moving on the seat cushion and provided with a release button (84*e*, 84*f*), and a length-adjustable belt (8.1), a free end of which is attached to the seat frame.

15. The anti-submarining seat-belt assembly according to claim 14, wherein the free-moving anti-submarining buckle assembly is provided with an electrical release-motor (4.2*b*), which, when receiving an electrical signal emitted from the main buckle assembly resulting from depressing the main release button releasing the main latch plate, pulls the release button to release the anti-submarining latch plate.

16. The anti-submarining seat-belt assembly according to claim 14, wherein the length-adjustable belt (8.1) is provided with vibration-dampening energy absorbers.

17. The anti-submarining seat-belt assembly according to claim 1, wherein the anti-submarining buckle assembly is provided with a coupling fitting (1.2*a*, 1.2*b*) to receive vibration-dampening energy absorbers.

18. An anti-submarining seat-belt assembly for a seat having a seat cushion, comprising
   a seat belt, comprising first and second shoulder belt portions (1.1, 1.2), a lap belt portion (1.3) and an extending belt portion (1.4);
   a main buckle assembly (9.1), having a master release button (84) and attached to a stiff first transport-system member, which is a floor of the transport system adjacent to a first seat-side or a seat-cushion frame at the first seat-side or a mid-tunnel of a motor vehicle adjacent to the first seat-side;
   a lower belt deflector (17), deflecting and loosely guiding the lap belt portion (1.3) or the first shoulder belt portion (1.1) and attached to a stiff second transport-system member, which is the floor of the transport system adjacent to a second seat-side or the seat-cushion frame at the second seat-side or a post section of the motor vehicle adjacent to the second seat-side or a side rail of the motor vehicle adjacent to the second seat-side;
   at least three latch plates (2, 9, 11, 25), the first of which is a main latch plate (9), moveable along the lap- or shoulder belt portion, the second of which is an anti-submarining latch plate (11, 25), moveable along the lap belt portion, and the third of which is a shoulder latch plate (2), fastened to a first belt end (ER) of the first shoulder belt portion (1.1); and
   anti-submarining buckle assemblies, attached to a seat frame of the seat, which is the seat-cushion frame or a seat-backrest frame;
   whereby
   a lower part of the body (96) of the passenger is restrained by the lap belt portion (1.3), when the main latch plate (9) is plug-in connected to the main buckle assembly (9.1);
   an upper part of the body (95) is restrained by extending the first and second shoulder belt portions (1.1, 1.2) crosswise in an X-shape, when the shoulder latch plate (2) is plug-in connected to an upper buckle assembly (4, 4*b*, 14, 14*a*, 18, 18*a*, 18*b*, 18.1 to 18.3), arranged to a seat backrest at the first seat-side; and
   the lap belt portion (1.3) is subdivided into two anti-submarining belt portions (1.3R, 1.3L) to restrain thighs of the passenger when the anti-submarining latch plate is plug-in connected to one of the anti-submarining buckle assemblies.

19. An anti-submarining seat-belt assembly for a seat having a seat cushion, comprising
   a seat belt, comprising first and second shoulder belt portions (1.1, 1.2), a lap belt portion (1.3) and an extending belt portion (1.4);
   a main buckle assembly (9.1), having a master release button (84) and attached to a stiff first transport-system member, which is a floor of the transport system adjacent to a first seat-side or a seat-cushion frame at the first seat-side or a mid-tunnel of a motor vehicle adjacent to the first seat-side;
   a lower belt deflector (17), deflecting and loosely guiding the lap belt portion (1.3) or the first shoulder belt portion (1.1) and attached to a stiff second transport-system member, which is the floor of the transport system adjacent to a second seat-side or the seat-cushion frame at the second seat-side or a post section of the motor vehicle adjacent to the second seat-side or a side rail of the motor vehicle adjacent to the second seat-side;
   at least three latch plates (2, 9, 11, 25), the first of which is a main latch plate (9), moveable along the lap- or shoulder belt portion, the second of which is an anti-submarining latch plate (11, 25), moveable along the lap belt portion, and the third of which is a shoulder latch plate (2), fastened to a first belt end (ER) of the first shoulder belt portion (1.1) and a belt-feeding device (20, 20*d*), attached to a seat backrest; and
   anti-submarining buckle assemblies, attached to a seat frame of the seat, which is the seat-cushion frame or a seat-backrest frame;
   whereby
   a lower part of the body (96) of the passenger is restrained by the lap belt portion (1.3), when the main latch plate (9) is plug-in connected to the main buckle assembly (9.1);
   an upper part of the body (95) is restrained by extending the first and second shoulder belt portions (1.1, 1.2) crosswise in an X-shape, when the belt-feeding device (20, 20*d*) together with the first shoulder belt portion (1.1) and the shoulder latch plate (2) moves from a resting position at the second seat-side to an operative position at the first seat-side until the shoulder latch plate (2) is plug-in connected to an upper buckle assembly (4), located on a top edge of the seat backrest at the first seat-side; and
   the lap belt portion (1.3) is subdivided into two anti-submarining belt portions (1.3R, 1.3L) to restrain thighs of the passenger when the anti-submarining latch plate is plug-in connected to one of the anti-submarining buckle assemblies.

* * * * *